Feb. 8, 1949.  W. J. KOINZAN  2,460,888
OIL FILTER
Filed Dec. 1, 1944  2 Sheets-Sheet 2

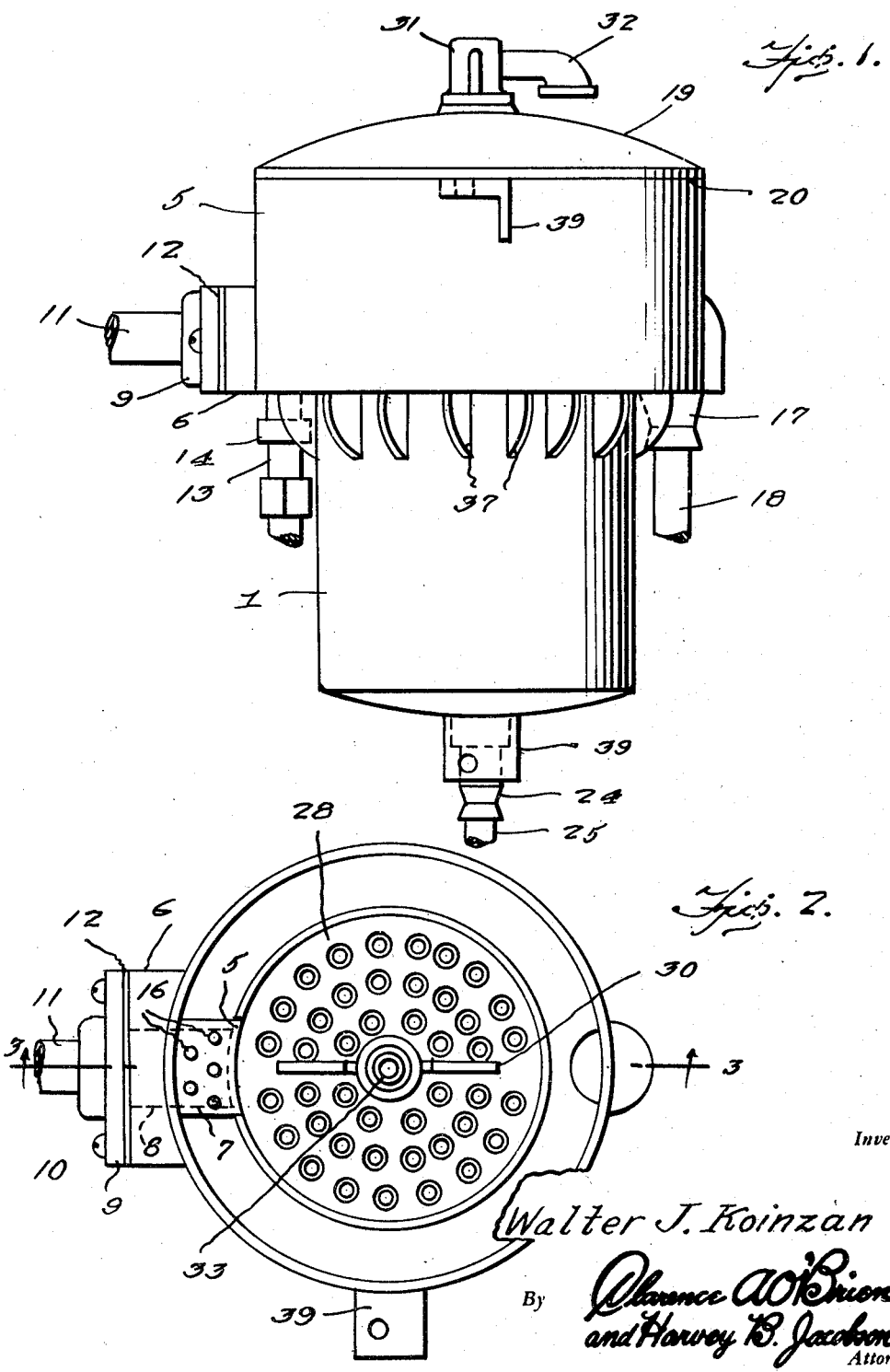

Inventor
Walter J. Koinzan
By Clarence A. O'Brien
and Harvey B. Jacobson
Attorneys Patented Feb. 8, 1949

2,460,888

UNITED STATES PATENT OFFICE 2,460,888

OIL FILTER

Walter J. Koinzan, Elgin, Nebr.

Application December 1, 1944, Serial No. 566,178

1 Claim. (Cl. 210—122.5)

My invention relates to oil filters for use on internal combustion engines for filtering the oil as it is pumped from the crankcase and is designed as an improvement over the filter equipment forming the subject matter of my U. S. Letters Patent No. 2,088,243, dated July 27, 1937.

The principal object of the present invention is to provide improved means for evaporating the water and other dilution contents of the oil under the action of heat from the exhaust manifold of the engine and to furthermore improve upon the general arrangement and construction of the parts so that said parts may be quickly assembled and economically manufactured.

Other and subordinate objects are also comprehended by my invention, all of which, together with the precise nature of my improvements will be readily understood when the succeeding description and claim are read with reference to the drawings accompanying and forming part of this specification.

In said drawings:

Figure 1 is a view in side elevation of a preferred embodiment of my improved filter, Figure 2 is a view in top plan with the cap member removed.

Figure 3:
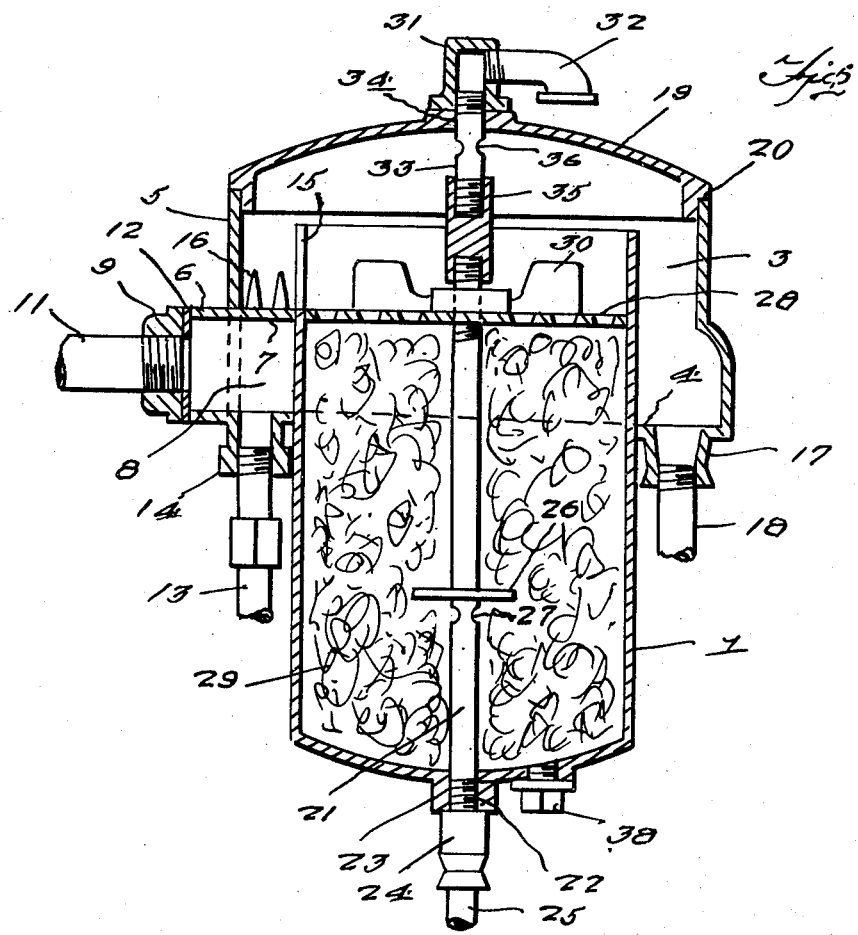
Figure 3 is a view in vertical section taken on the line 3—3 of Figure 2.
Figure 4:
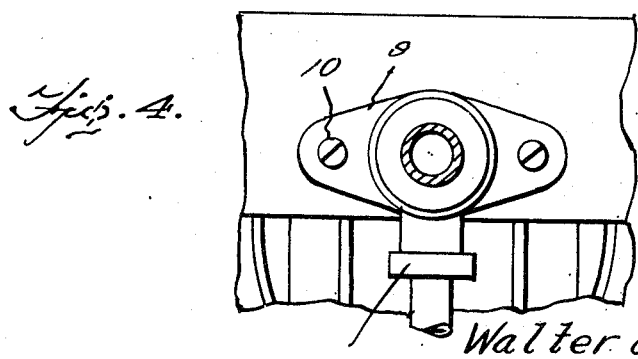
Figure 4 is a fragmentary view in side elevation.

Referring to the drawings by numerals, in its preferred embodiment, my improved filter comprises as its main elements a substantially cylindrical, open-top shell 1 forming an oil filtering bowl.

The shell 1 has formed integrally therewith an upper, annular trough 3 embodying a substantially flat bottom wall 4 and a side wall 5 spaced from the upper end of the shell 1, concentrically thereof, and extending above the same. A nipple 6 extends radially outwardly from the side wall 5 at the bottom of the trough 3 and which forms an extension of and opens into a hollow heating dome 7, upstanding from the bottom 4 of the trough 3 between the side wall 5 and the shell 1, and is spaced below the rim of the shell, as shown in Figure 2.

The nipple 6 and dome 7 form together a heating chamber 8, the inner end of which is located in the trough 3 with its top below the rim of the shell 1. The outer end of the nipple 6 is closed by a coupling 9 secured thereto by screws 10 and for attaching the nipple to the exhaust pipe of the internal combustion engine, as by an inlet pipe 11 threaded into said coupling. A suitable gasket 12 is interposed between the nipple 6 and the coupling 9. A heat discharge outlet pipe 13 is threaded into an outlet nipple 14 depending from the bottom 4 of the trough 3 in vertical alignment with the dome 7 and opening into the bottom of said dome. The shell 1 is provided with a vertical slot 15 therein extending downwardly from the rim to the top of the dome 7, centrally of the latter, said slot forming an overflow aperture for the escape of oil out of the shell 1 onto the top of the dome 7 and down the sides of the latter into the trough 3. A plurality of upstanding teats 16 are provided on the top of dome 7 to retard the flow of oil thereover. Diametrically opposite the nipple 6 and dome 7 the trough 3 is provided with a depending, internally threaded outlet nipple 17 in the bottom thereof for connection of a return line 18 to the crankcase of the engine, not shown.

The trough 3 is closed by a dome-shaped cap member 19 fitting into the top of said trough and undercut, as at 20, to seat upon the rim of said trough 3. The cap member 19 is detachably secured in place by means presently described.

An oil inlet tube 21 extends upwardly into the shell 1 through the bottom of the same and is preferably threaded, as at 22, through a boss 23 on said bottom, said tube extending in the axis of said shell 1 into the top thereof and having its lower end coupled, as at 24, to an oil inlet line 25 adapted for connection to an oil pump, not shown, so that the oil is pumped to the tube 21 from the crankcase of the engine.

At a suitable point above the bottom of the shell 1, the oil feed tube 21 has fixed thereon a preferably circular oil spreader 26 of disk form. Radial oil discharge ports 27 are provided in said tube 21 immediately below the spreader 26.

Threaded down on the upper end of the oil feed tube 21 to the level of the lower end of the slot 15 is a perforated disk 28 functioning to pack a mass of filtering material 29 down in the shell 1. The disk 28 is provided with a pair of diametrical wings 30 on its upper side and upon opposite sides of the tube 21 for turning said disk on and off said tube.

On top of the cover cap 19 is a hollow wing nut 31 having turned into one side thereof a laterally extending downturned vapor outlet nipple 32. The wing nut 31 forms part of means for securing the cap member 19 in place, the remaining parts comprising a short tube 33 extending through a suitable axial aperture 34 in said cap member and threaded at its upper end into said nut, and a short internally threaded sleeve 35 coupling the lower end of the tube 33 to the upper end of the oil feed tube 21. The tube 33 intermediate the cap 19 and tube 21 is provided with radial inlet ports 36 for the passage of vapor into the same and to the nipple 33 by way of nut 31.

Below the bottom 4 of trough 3 and the outer side of the shell 1 a plurality of webs 37 are provided forming cooling fins on said bottom.

Referring now to the operation of the described form of my invention, the oil pumped into the lower end of the oil feed tube 21 overflows out of the ports 27 into the shell 1 to rise through the filtering mass 29, being deflected outwardly by spreader 26 whereby an even flow of oil up through said mass is effected. The heavier solids not collected in the mass of filtering material 29 sink to the bottom of the shell 1 to be drained out through a suitable drain plug 38. As the oil rises through said mass 29 and above the disk 28, it escapes out of slot 15 to flow over the dome 7 into the trough 3, being heated by its passage over said dome and cooled after it leaves the region of said dome by the cooler bottom of the trough 3. As the oil passes over the dome 7, under the action of the heat therein, rapid evaporation of water or other dilution takes place, the vapors escaping out of tube 33, nut 31 and nipple 33. The thus purified oil flows out of the trough 3 by way of discharge outlet nipple 17 to be returned to the crankcase of the engine. The heat in the chamber 8 is discharged by way of the outlet nipple 14 and the outlet pipe 13.

The device may be easily disassembled for cleaning and repacking with filtering material by turning the wing nut 31 to unscrew the sleeve 35, thus removing the wing nut 31, cap 19, tube 33, sleeve 35 and nipple 32, as a unit. The disk 28 may then be removed so that the filtering mass may be replaced.

Suitable attaching ears as at 39 are provided on the device, as shown in Figures 1 and 2.

The foregoing will, it is believed, suffice to impart a clear understanding of my invention without further explanation.

Manifestly, modifications of the invention other than described herein may be resorted to without departing from the inventive concept, and right is herein reserved to such other modifications as fall within the scope of the subjoined claim.

Having described the invention, what I claim is:

In an oil filter for internal combustion engines, a cylindrical open top casing adapted to be disposed upright and forming a filtering chamber, a filtering mass in the bottom of said chamber, a slot in the rim of said casing forming an overflow outlet for filtered oil, an axial oil inlet tube in said casing threaded through the bottom thereof for connection to an oil pump whereby oil may be forced into said casing to rise through said mass and overflow out of said slot, an annular trough surrounding the upper part of said casing for catching the overflow oil and having a bottom below the level of said slot and a side wall, an outlet nipple in the bottom of said trough for connection to a return line to the engine, a hollow heating dome rising from the bottom of said trough below said slot to heat the oil thereon issuing from the slot, for vaporizing water and gasoline contents of said oil, a nipple extending from said trough for receiving exhaust heat from the engine and opening into said dome to heat the same, a closure cap for said trough covering the top of said casing, and means to secure said cap to said side wall comprising a perforated tube extending through the top of said cap, a threaded sleeve coupling the perforated tube to the upper end of the oil inlet tube, a hollow wing nut threaded onto the upper end of the perforated tube and having a lateral tubular outlet tube therein, said perforated tube, wing nut and outlet tube forming an outlet passage for the vaporized water and gasoline.

WALTER J. KOINZAN.

REFERENCES CITED

The following references are of record in the file of this patent:

UNITED STATES PATENTS

| Number | Name | Date |
| --- | --- | --- |
| 1,849,042 | Pickard et al. | Mar. 8, 1932 |
| 2,068,473 | Schwalge | Jan. 19, 1937 |
| 2,088,243 | Koinzan | July 27, 1937 |
| 2,206,358 | Koinzan | July 2, 1940 |
| 2,274,132 | Ehlers | Feb. 24, 1942 |